Jan. 3, 1939.   B. POSNER   2,142,654
HOLDER AND CONTAINER FOR ELECTRIC IRON CORDS
Filed Jan. 25, 1937   2 Sheets-Sheet 1

INVENTOR
BENJAMIN POSNER
BY
ATTORNEY

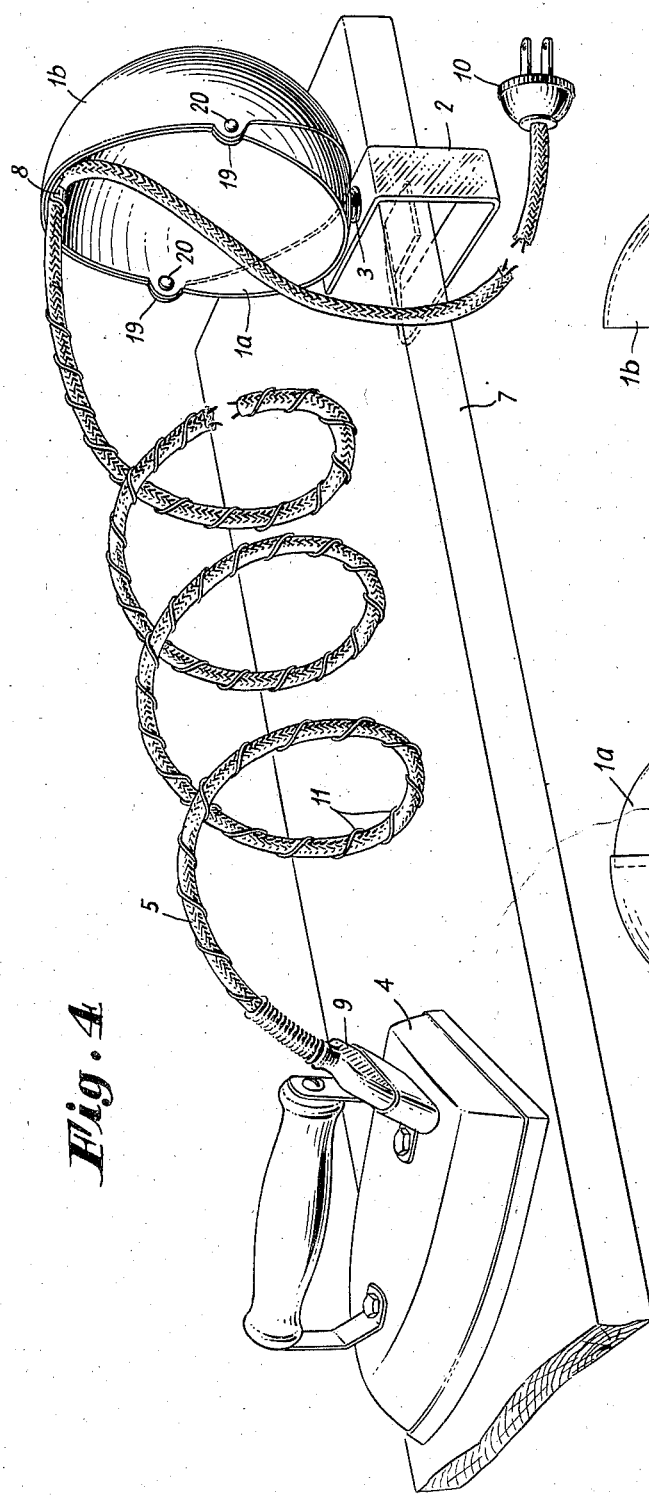
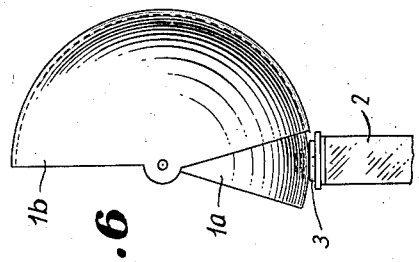
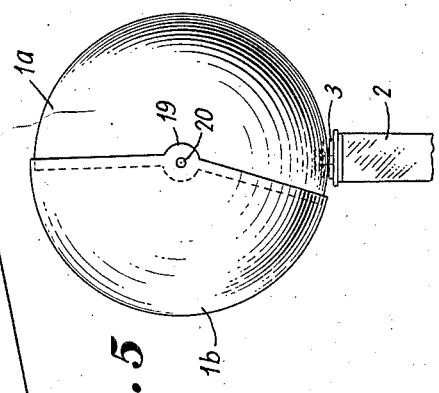

Patented Jan. 3, 1939

2,142,654

UNITED STATES PATENT OFFICE 2,142,654

HOLDER AND CONTAINER FOR ELECTRIC IRON CORDS

Benjamin Posner, Brooklyn, N. Y.

Application January 25, 1937, Serial No. 122,147

7 Claims. (Cl. 173—367)

This invention relates to electrical appliances having electric cords attached thereto and more particularly to a combined holder and container for electric iron cords or cables.

In the customary use of electric irons the current supply cable or cord is connected by means of plugs at one end to the iron and at the other end to a current outlet in the wall. In the to and fro movements of the iron the cable or cord must of necessity follow the movements of the iron. When there is sufficient slack in the cable, which is usually the case, the cord is continually dragged over the linen or other article during ironing, disarranging and sometimes soiling it, and on the backward or return movement of the iron, the cable which has been dragged forwardly is in the path of the iron and is frequently contacted thereby, burning the insulation and eventually causing a short circuit. However, when there is insufficient slack in the cable and the electric iron is moved too far in a forward direction, the pull exerted at both terminal plugs causes a loosening and oftentimes a breaking of the connections between the cable and the plug contacts. Also such pull has a tendency to withdraw the plug from the wall outlet, resulting in much annoyance and inconvenience.

I am aware of certain proposals that have heretofore been made, as by means of coiled springs and cable supporting means, to obviate the above noted disadvantages, but as far as I know no attempt has been made to avoid in addition the following disadvantages which are a considerable source of annoyance.

After the ironing is done it is usual for the launderer to disconnect the plug at the wall outlet and to wind the cable around the hot iron in some fashion or other. This has the tendency to burn the insulation and hence lessen the life of the cable. Frequently the cord is removed from the iron and is thrown into a drawer or other place where it constantly gets thrown around, getting tangled and twisted.

It is therefore the main object of my invention to provide a suitable container wherein the cable including the usual terminal plugs may be neatly and safely placed when not in use, thereby not only protecting the same and insuring longer life, but also providing a compact device for convenient placement, said container serving also as the anchoring and supporting means for an intermediate portion of the cable when the device is in use.

The novel features characteristic of my invention are set forth with particularity in the appended claims. The invention itself, however, both as to its construction and mode of operation together with further objects and advantages thereof, will best be understood by reference to the following description taken in connection with the accompanying drawings in which Figure 1 is a view in front elevation of the complete assembly of container, table clamp, cable and coil spring in operative condition, according to one form of the invention.

Figure 4 is a perspective view of another form of the invention, and

Figures 5 and 6 illustrate the container of Figure 4 in closed and in opened positions, respectively.

Similar numerals refer to similar parts throughout the several views.

Figure 1:
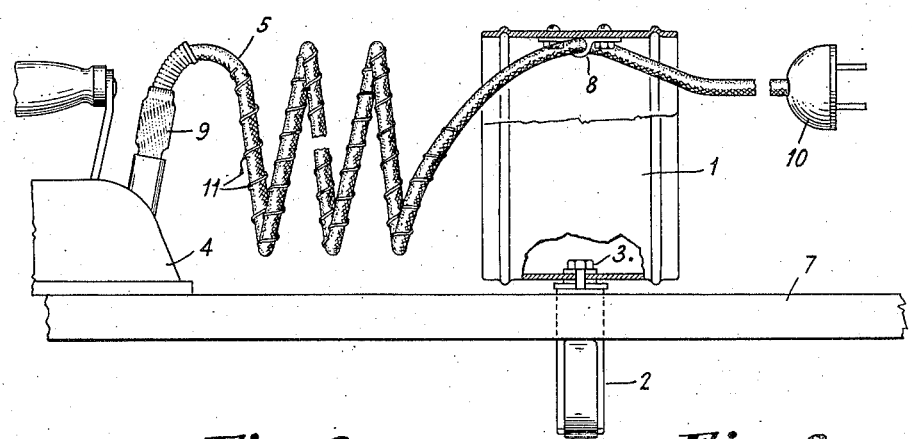
Figure 2:
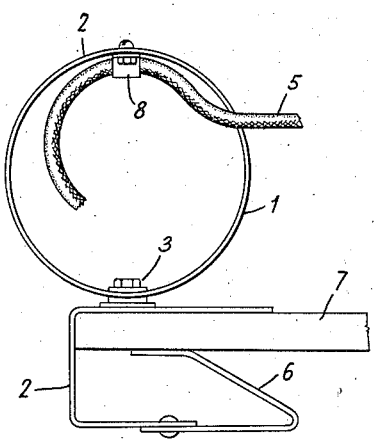
Figure 2 is a side view of the container, table clamp and the cable anchoring means.

Referring now to Figures 1 and 2, I provide an open-ended container 1 of suitable material such as sheet metal, Bakelite and the like, and preferably circular in cross-section, although other suitable shapes may be utilized if desired. A table clamp 2 is associated with the container as by means of the swivelled connection 3, the purpose of which is to permit the container to oscillate about its pivotal point in response to the motion of the iron 4 which motion is transmitted to the container through that portion of the cable 5 connected between them. The table clamp 2 is shown as having a leaf spring 6 riveted to the main body portion and engaging the under surface of the table or ironing board 7. It will be understood of course that any other form of clamp may be used.

Opposite to the swivel 3 there is riveted or otherwise suitably connected to the container 1 a bracket member 8 for anchoring and supporting the electric cable 5. The usual plug terminals 9 and 10 are connected to the cable ends, the former being used for connection to the electric iron and the latter for connection to the wall outlet. Between the plug 9 and the anchoring bracket 8 I provide a coiled or spiral spring 11 which may extend to within a short distance of the plug and of the bracket. The coiled or spiral spring 11 is shown in Figure 1 in partly extended position, that is, when the iron has been moved forwardly. In this condition the cable between 8 and 9 assumes a spiral formation, with the spring under tension. On the return or backward movement of the iron, the spring retracts and assists to some extent the return of the iron. For convenience of illustration a simple coiled spring has been shown. However I am not to be limited thereto, since any one of a number procurable on the market may be used with equal success.

Figure 3:
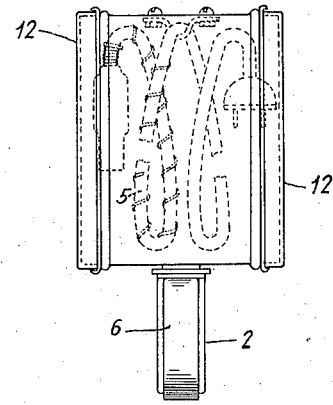
Figure 3 is a view similar to that of Figure 1 showing the cable and plug housed within the container, with the closures or cover plates in position.

In Figure 3 I have shown the container removed from table, the coiled portion of the cable retracted therein, the non-coiled portion also positioned within the container, and the cover plates 12 applied to the open ends of the container. The container is made of sufficient size to receive and retain also the plugs 9 and 10. It will be seen from Figure 3 that I have provided a compact device which may be stored away when not in use in a very limited space. Altho I have shown the cover plates as removable, it is within the contemplation of my invention to suitably hinge the cover plates at their lower ends, so that in use they may rest on the table.

In Figures 4 to 6 I have shown a form of the invention which provides the additional advantage in that the container is formed by two hinged parts so that removable cover plates are not required. The container is made spherical in shape and is comprised by the parts 1a and 1b. Each part is provided with ears 19 at diametrically opposite points, and corresponding ears of said parts are hinged as at 20. The table clamp 2 is connected as by the swivel 3, or otherwise, to the part 1a which constitutes the relatively stationary member of the container. The anchoring bracket 8 for the electric cable is affixed to this stationary part at a point opposite the connection 3 as shown. The cable 5, coiled spring 11 and the terminal plugs 9 and 10 are otherwise the same as shown in Figure 1.

The device is shown, in Figure 4, in operative position, the movable part 1b of the container having been swung rearwardly on its pivotal points 20, 20 to permit ready access to and removal from within the container of the coiled and the non-coiled portions of the cable. When not in use both portions of the cable together with the terminal plugs 9 and 10 are positioned within the container and the movable or closure part 1b is swung forwardly to the closed position shown in Figure 5.

While I have shown and described certain preferred embodiments of my invention, I do not desire to limit myself to the same, but such other modifications may be employed as come within the spirit and scope of my invention as defined by the appended claims.

Having thus particularly described my invention, what I claim as new and desire to secure by Letters Patent, is:—

1. In combination, a container, a table clamp, a swivel connection between said container and table clamp, an electric cord and means for clamping an intermediate portion thereof within said container, a plug attached to each end of said electric cord, and a coiled spiral spring wound around and engaging the electric cord between the intermediate clamped portion and one of the plugs, whereby the coiled portion of the electric cord is adapted to be normally drawn into and housed within said container.

2. In combination, a container, means for clamping said container in position on a table or ironing board, an electric cord and means for clamping an intermediate portion thereof in fixed position within the container, a plug attached to each end of said electric cord, and a spiral retractile spring wound around and engaging the electric cord between the intermediate supported portion and one of the plugs, whereby in retracted position of the spring the electric cord portion associated therewith is adapted to be coiled into circular form and placed into the container.

3. A device of the class described comprising an open ended container, an electric iron cord and means within said container for holding said cord at an intermediate point thereof in fixed position within the container, clamping means attached to said container adapted to support the same in position on a table or ironing board, a plug attached to each end of said cord, a coiled spring wound about said cord between one of the plugs and the cord where it is held in fixed position, said electric cord and plugs adapted when not in use to be housed within said container, and a cover for each end of the container.

4. A device of the class described comprising an open ended container, an electric cord and means for anchoring said cord at an intermediate point thereof within said container, table clamping means attached to said container, a plug attached to each end of said cord, said electric cord and plugs adapted when not in use to be housed within said container, and a cover plate for each end of the container.

5. A device of the class described comprising a container constituted by two substantially hemispherical parts hinged together, an electric cord and means for anchoring said cord at an intermediate point thereof within the container, table clamping means attached to said container adapted to support the same in position on a table or ironing board, a plug attached to each end of said cord, a coiled spring wound around said cord, said electric cord and plugs adapted when not in use to be housed within said container.

6. A device of the class described comprising a container constituted by two substantially hemispherical parts which are hinged together so that in open position one part is substantially nested within the other and in closed position the two parts form a sphere, an electric cord and means for anchoring said cord at an intermediate point thereof within said container, table clamping means, a swivel connection between said container and clamping means, a plug attached at each end of said cord, a retractable spiral spring wound around said cord between one of the plugs and the cord where it is anchored to the container, said electric cord and plugs adapted when not in use to be housed within said container.

7. A device of the class described comprising an open ended container, an electric cord and means for anchoring said cord at an intermediate point thereof within the container, table clamping means rotatably attached to said container, a plug attached at each end of said cord, a retractable spiral spring wound about said cord between one of the plugs and the intermediate anchored point of the cord, said electric cord and plugs adapted when not in use to be drawn into said container, and a cover plate for each end of the container.

BENJAMIN POSNER.